United States Patent
Lin et al.

(10) Patent No.: US 10,678,354 B2
(45) Date of Patent: Jun. 9, 2020

(54) ELECTRONIC SYSTEM

(71) Applicant: ELAN MICROELECTRONICS CORPORATION, HsinChu (TW)

(72) Inventors: Yen-Shih Lin, Hsinchu (TW); Tien-Wen Pao, Hsinchu County (TW); Nan-Jung Liu, Hsinchu County (TW)

(73) Assignee: ELAN MICROELECTRONICS CORPORATION, HsinChu (TW)

( * ) Notice: Subject to any disclaimer, the term of this patent is extended or adjusted under 35 U.S.C. 154(b) by 0 days.

(21) Appl. No.: 16/361,186

(22) Filed: Mar. 21, 2019

(65) Prior Publication Data
US 2019/0302899 A1  Oct. 3, 2019

(30) Foreign Application Priority Data
Apr. 3, 2018 (TW) .............................. 107111843 A

(51) Int. Cl.
| | |
|---|---|
| *G06F 3/038* | (2013.01) |
| *G06F 3/0354* | (2013.01) |
| *G06F 3/0338* | (2013.01) |
| *G06F 3/041* | (2006.01) |
| *G06F 3/045* | (2006.01) |
| *G06F 3/044* | (2006.01) |

(52) U.S. Cl.
CPC ............ *G06F 3/038* (2013.01); *G06F 3/0338* (2013.01); *G06F 3/03547* (2013.01); *G06F 3/0416* (2013.01); *G06F 3/044* (2013.01); *G06F 3/045* (2013.01)

(58) Field of Classification Search
CPC .... G06F 3/038; G06F 3/0338; G06F 3/03541; G06F 3/03547; G06F 3/0416; G06F 3/044; G06F 3/045; G06F 3/0488
See application file for complete search history.

(56) References Cited

U.S. PATENT DOCUMENTS

| | | | | |
|---|---|---|---|---|
| 2006/0165132 | A1* | 7/2006 | Chang | G06F 3/038 370/535 |
| 2013/0109317 | A1* | 5/2013 | Kikuchi | H01P 5/1022 455/41.2 |
| 2015/0309720 | A1* | 10/2015 | Fisher | G06F 3/04845 715/752 |
| 2015/0347080 | A1* | 12/2015 | Shin | G09G 3/001 345/173 |

(Continued)

*Primary Examiner* — Tom V Sheng
(74) *Attorney, Agent, or Firm* — Winston Hsu

(57) ABSTRACT

An electronic system is provided, which includes a mainboard, a pointing stick and a touchpad module, a first transmission path and a second transmission path. The mainboard is disposed with a first connecting unit. The pointing stick is connected to the first connecting unit through a transmission line. The touchpad module includes a circuit board, a second connecting unit and a controller. The circuit board includes a touch sensor. The first transmission path and the second transmission path are connected between the first connecting unit and the second connecting unit. The sensing signal outputted by the pointing stick is transmitted to the controller through the transmission line, the first connecting unit, the first transmission path and the second connecting unit. The output signal of the controller is transmitted to the mainboard through the second connecting unit, the second transmission path and the first connecting unit.

10 Claims, 1 Drawing Sheet

(56) References Cited

U.S. PATENT DOCUMENTS

| | | | |
|---|---|---|---|
| 2016/0162105 A1* | 6/2016 | Shigetaka | G06F 3/0416 345/174 |
| 2017/0189250 A1* | 7/2017 | Juhasz | A61G 5/043 |
| 2018/0035296 A1* | 2/2018 | Wu | H04W 12/06 |
| 2018/0056180 A1* | 3/2018 | Russell | A63F 13/24 |
| 2019/0132569 A1* | 5/2019 | Karpenko | G06T 19/00 |
| 2019/0213015 A1* | 7/2019 | Raghunath | G06F 3/0601 |
| 2019/0227764 A1* | 7/2019 | Liu | G06F 3/0304 |
| 2019/0361120 A1* | 11/2019 | Li | G01S 17/08 |
| 2020/0019210 A1* | 1/2020 | Zhao | G06F 3/14 |

* cited by examiner

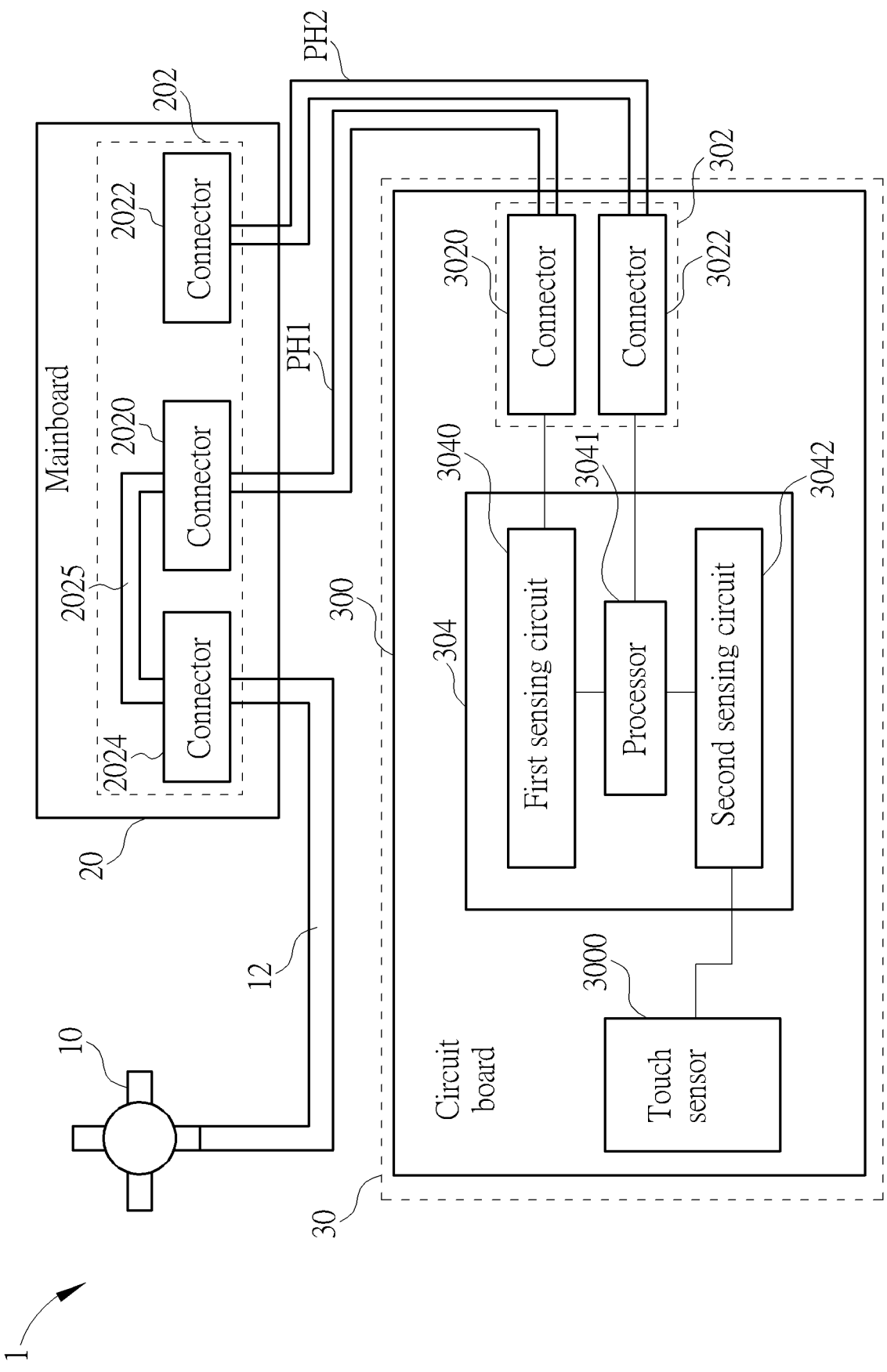

ELECTRONIC SYSTEM

BACKGROUND OF THE INVENTION

1. Field of the Invention

The present invention relates to an electronic system, and more particularly, to an electronic system including a pointing stick and a touchpad module.

2. Description of the Prior Art

A touch pad is commonly used as an input device in a notebook for controlling a mouse cursor. Moreover, a pointing stick is also commonly used as an input device in a notebook. A user can apply force with a finger on the pointing stick to control movements of the mouse cursor. A current notebook may be equipped with both the pointing stick and the touchpad. The conventional method uses two separate controllers to process the sensing signals of the pointing stick and the touchpad respectively. For example, one controller is dedicated to process the sensing signals of the pointing stick. The other controller is dedicated to process the sensing signals of the touchpad.

SUMMARY OF THE INVENTION

It is therefore an objective of the present invention to provide an electronic system having advantages of convenient maintenance and repair.

According to an embodiment of the present invention, an electronic system comprising: a mainboard, disposed with a first connecting unit; a pointing stick connected to the first connecting unit through a transmission line; a touchpad module comprising: a circuit board comprising a touch sensor; a second connecting unit; and a controller coupled to the touch sensor and the second connecting unit for processing sensing signals outputted by the pointing stick and the touch sensor; and a first transmission path and a second transmission path, connected between the first connecting unit and the second connecting unit; wherein the sensing signal outputted by the pointing stick is transmitted to the controller through the transmission line, the first connecting unit, the first transmission path and the second connecting unit, the sensing signal outputted by the controller is transmitted to the mainboard through the second connecting unit, the second transmission path and the first connecting unit.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWINGS

The FIGURE is a schematic diagram of an electronic system according to an embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Please refer to the FIGURE, which is a schematic diagram illustrating an electronic system 1 according to an embodiment of the present invention. The electronic system 1 includes a pointing stick 10, a mainboard 20 and a touch pad module 30. The electronic system 1 can be applied in various electronic products, such as notebooks, keyboards, but not limited thereto. The pointing stick 10 is configured to generate corresponding sensing signals in response to operations of an object operating on the pointing stick 10. Details of the pointing stick may be disclosed in following applications and websites: U.S. Pat. Nos. 6,993,982, 7,151,431, 7,040,182 or https://en.wikipedia.org/wiki/Pointing_stick, and further description is omitted herein for brevity. The mainboard 20 includes a connecting unit 202. The pointing stick 10 is connected to the connecting unit 202 through a transmission line 12. One end of the transmission line 12 is mounted on the pointing stick 10 and the other end of the transmission line 12 is connected to the connecting unit 202. The transmission line 12 may be a flexible flat cable (FFC), a flexible printed circuit board (FPCb) or a micro coaxial cable. In the embodiment of the FIGURE, the connecting unit 202 includes connectors 2020, 2022 and 2024, and this should not be a limitation of the present invention. The connector 2024 is connected to the transmission line 12. The connector 2024 is connected to the connector 2020 through a transmission line 2025. The transmission line 2025 may be a signal trace of the mainboard 20, an FFC, an FPCb or a micro coaxial cable.

The touchpad module 30 includes a circuit board 300, a connecting unit 302 and a controller 304. The circuit board 300 includes a touch sensor 3000. The touch sensor 3000 may be a capacitive touch sensor or a resistive touch sensor. A transmission path PH1 and a transmission path PH2 are connected between the connecting unit 202 and the connecting unit 302. The transmission path PH1 is utilized for transmitting sensing signals (analog signals) outputted by the pointing stick 10 to the touchpad module 30. The transmission path PH2 is utilized for transmitting output signals of the controller 304 to the mainboard 20. In the embodiment of the FIGURE, the connecting unit 302 includes connectors 3020 and 3022, and this should not be a limitation of the present invention. One end of the transmission path PH1 is connected to the connector 2020 and the other end of the transmission path PH1 is connected to the connector 3020. The transmission path PH1 can be implemented by an FFC, an FPCb or a micro coaxial cable. One end of the transmission path PH2 is connected to the connector 2022 and the other end of the transmission path PH2 is connected to the connector 3022. The transmission path PH2 can be implemented by an FFC, an FPC or a micro coaxial cable.

The controller 304 is coupled to the touch sensor 3000 and the connecting unit 302. The controller 304 is utilized for processing sensing signals (analog signals) outputted by the pointing stick 10 and the touch sensor 3000. In the embodiment of the FIGURE, the controller 304 and the connecting unit 302 are disposed on the circuit board 300. In some other embodiments, the controller 304 may also be disposed on a flexible circuit board electrically connected to the circuit board 300.

As shown in the FIGURE, the controller 304 is connected to the connector 3020 for receiving sensing signals outputted by the pointing stick 10. The controller 304 can be an integrated circuit device. In an embodiment, the controller 304 can be a system-on-a-chip (SOC). The controller 304 includes a first sensing circuit 3040, a processor 3041 and a second sensing circuit 3042. The processor 3041 is coupled to the first sensing circuit 3040, the second sensing circuit 3042 and the connector 3022 of the connecting unit 302. The first sensing circuit 3040 is coupled to the connector 3020 of the connecting unit 302 for sensing the pointing stick 10 and processing the sensing signals (analog signals) outputted by the pointing stick 10. The processor 3041 performs processing and calculation operations according to the output of the first sensing circuit 3040 so as to generate an output signal, such as coordinate information. The second sensing circuit 3042 is coupled to the touch sensor 3000 for sensing the touch sensor 3000 and processing the sensing signals (analog signals) outputted by the touch sensor 3000. The processor 3041 performs processing and calculation operations according to the output of the second sensing circuit 3042 so as to generate an output signal, such as information of touch coordinates and the number of touch object. The output signal generated by the processor 3041 is transmitted to the mainboard 20 via the connector 3022 of the connecting unit 302. The communication between the controller 304 and the mainboard 20 is well known by those skilled in the art, and is omitted herein for brevity.

The controller 304 may be realized as a single controller, such as EKTF3700 series controller developed by ELAN Microelectronics Corp., which integrates both the conventional pointing stick controller and touchpad controller. The conventional technique needs two separate controllers to respectively process the sensing signals of the pointing stick 10 and the touch sensor 3000. Compared to the prior art, the embodiment of the FIGURE has the advantage of low cost since the embodiment of the electronic system 1 only requires a single controller 304. Moreover, when the pointing stick 10 needs to be repaired or replaced, the user merely needs to remove the transmission line 12 from the connector 2024 without requiring time consuming disassembly of the internal components. For example, in a notebook, the touchpad module 30 is disposed under the keyboard. The pointing stick 10 is disposed between multiple keys of the keyboard. If the transmission line 12 of the pointing stick 10 is directly connected to the connector 3020 of the touchpad module 30 and the user wants to remove the pointing stick 10 and the transmission line 12, the user must remove the casing and structural component (often referred to as a palm rest) below the keyboard and take out the touchpad module 30 in order to remove the transmission line 12 out from the connector 3020 Such complex and inconvenient disassembly can be avoid in the arrangements of the electronic system 1 shown in the FIGURE, which means the electronic system 1 shown in the FIGURE can improve efficiency, save manpower, simplify operations of maintenance and reduce maintenance costs.

The sensing signals outputted by the pointing stick 10 are analog signals. The sensing signals outputted by the pointing stick 10 can be transmitted to the controller 304 through the transmission line 12, the connecting unit 202, the transmission path PH1 and the connecting unit 302. The output signals transmitted from the controller 304 to the mainboard 20 are digital signals. The output signals transmitted by the controller 304 can be transmitted to the mainboard 20 through the connecting unit 302, the transmission path PH2 and the connecting unit 202. The transmission path PH1 is utilized for transmitting analog signals outputted by the pointing stick 10. The transmission path PH2 is utilized for transmitting digital signals outputted by the controller 304. In an embodiment, transmission path PH1 and the transmission path PH2 are independent and separate, thus effectively avoiding signal interference and improving the accuracy and reliability of signal transmission.

In an embodiment, the electronic system 1 is applied to a notebook. The mainboard 20 further includes at least one of a central processing unit (CPU), a chipset and a memory (not shown in FIGURES). The chipset may include a north bridge chip and a south bridge chip. The north bridge chip handles communications among the CPU, a display device and the memory. The south bridge chip handles communications between the CPU and the peripheral devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system, comprising:
   a mainboard, disposed with a first connecting unit;
   a pointing stick, connected to the first connecting unit through a transmission line;
   a touchpad module, comprising:
      a circuit board comprising a touch sensor;
      a second connecting unit; and
      a controller coupled to the touch sensor and the second connecting unit for processing sensing signals outputted by the pointing stick and the touch sensor; and
   a first transmission path and a second transmission path connected between the first connecting unit and the second connecting unit;
   wherein the sensing signal outputted by the pointing stick is transmitted to the controller through the transmission line, the first connecting unit, the first transmission path and the second connecting unit, output signal of the controller is transmitted to the mainboard through the second connecting unit, the second transmission path and the first connecting unit.

2. The electronic system of claim 1, wherein the controller and the second connecting unit are disposed on the circuit board.

3. The electronic system of claim 1, wherein the first connecting unit comprises a first connector, a second connector and a third connector, the first connector is connected to the transmission line and coupled to the second connecting connector, the second connector is connected to the first transmission path, and the third connector is connected to the second transmission path.

4. The electronic system of claim 3, wherein the first connector is connected to the second connector through a signal trace of the mainboard, a flexible flat cable, a flexible printed circuit board or a micro coaxial cable.

5. The electronic system of claim 1, wherein the second connecting unit comprises:
   a fourth connector, connected to the first transmission path; and
   a fifth connector, connected to the second transmission path.

6. The electronic system of claim 1, wherein the controller comprises:

a first sensing circuit coupled to the second connecting unit for processing the sensing signals outputted by the pointing stick;

a second sensing circuit coupled to the touch sensor for processing the sensing signals outputted by the touch sensor; and a processor coupled to the first sensing circuit, the second sensing circuit and the second connecting unit.

7. The electronic system of claim 1, wherein the controller is a system-on-a-chip.

8. The electronic system of claim 1, wherein the transmission line is a flexible flat cable, a flexible printed circuit board or a micro coaxial cable.

9. The electronic system of claim 1, wherein the first transmission path comprises a flexible flat cable, a flexible printed circuit board or a micro coaxial cable.

10. The electronic system of claim 1, wherein the second transmission path comprises a flexible flat cable, a flexible printed circuit board or a micro coaxial cable.

\* \* \* \* \*